US008037962B2

(12) United States Patent
Susaki

(10) Patent No.: US 8,037,962 B2

(45) Date of Patent: Oct. 18, 2011

(54) MOTORCYCLE

(75) Inventor: Tomoshige Susaki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 231 days.

(21) Appl. No.: 12/335,987

(22) Filed: Dec. 16, 2008

(65) Prior Publication Data

US 2009/0166119 A1 Jul. 2, 2009

(30) Foreign Application Priority Data

Dec. 28, 2007 (JP) ................................ 2007-341399

(51) Int. Cl.
*B62D 61/02* (2006.01)

(52) U.S. Cl. ........................ 180/219; 180/228; 180/312

(58) Field of Classification Search .................. 180/219, 180/312, 228; 280/281.1, 274
See application file for complete search history.

(56) References Cited

U.S. PATENT DOCUMENTS

| | | | | |
|---|---|---|---|---|
| 4,139,072 | A * | 2/1979 | Dawson | 180/312 |
| 5,183,130 | A * | 2/1993 | Nakamura et al. | 180/219 |
| 5,480,001 | A * | 1/1996 | Hara | 180/227 |
| 5,845,728 | A * | 12/1998 | Itoh et al. | 180/219 |
| 5,857,538 | A * | 1/1999 | Chambers | 180/219 |
| 6,290,015 | B1 * | 9/2001 | Horii et al. | 180/219 |
| 6,290,017 | B1 * | 9/2001 | Ito | 180/227 |
| 6,371,236 | B1 * | 4/2002 | Fukunaga | 180/219 |
| 2005/0178596 | A1 * | 8/2005 | Brendelson et al. | 180/228 |
| 2005/0247500 | A1 * | 11/2005 | Miyamoto | 180/219 |
| 2006/0197304 | A1 * | 9/2006 | Ishikawa et al. | 280/281.1 |
| 2006/0283650 | A1 * | 12/2006 | Kawamura et al. | 180/227 |
| 2007/0012500 | A1 * | 1/2007 | Brown et al. | 180/219 |
| 2008/0060865 | A1 * | 3/2008 | Prielinger et al. | 180/219 |
| 2008/0121455 | A1 * | 5/2008 | Ishida | 180/219 |

FOREIGN PATENT DOCUMENTS

JP 2007-118865 5/2007

* cited by examiner

*Primary Examiner* — Joanne Silbermann

*Assistant Examiner* — Maurice Williams

(74) *Attorney, Agent, or Firm* — Keating & Bennett, LLP

(57) ABSTRACT

A motorcycle that maintains sufficient vehicle rigidity with a simple structure. A main frame has an up-and-down extension part in a vehicle width center, side plates disposed apart on the right and left of the up-and-down extension part, and first and second supporting pipes. Both ends of the supporting pipes are attached to the side plates.

11 Claims, 5 Drawing Sheets

MOTORCYCLE

RELATED APPLICATIONS

This application claims the benefit of priority under 35 USC 119 of Japanese patent application no. 2007-341399, filed on Dec. 28, 2007, which is hereby incorporated by reference.

BACKGROUND OF THE INVENTION

1. Field of the Invention

The present invention relates to a motorcycle, and more specifically, to a body frame structure of a motorcycle.

2. Description of Related Art

In a conventional mono backbone type body frame structure of a motorcycle, a main frame that suspends an engine of the motorcycle extends from a head pipe to the rear in a vehicle width center, bends downward at a rear side of the engine, and reaches a vehicle bottom. Side plates are separately attached to right and left sides at a bottom end portion of the main frame, and a front end portion of a swing arm is supported between the side plates and the main frame.

JP-A-2007-118865 discloses a motorcycle having such a body frame structure. In this motorcycle, right and left side plates are secured by bolt to a main frame in the center. Two bosses (top and bottom) extend from the right and left side plates to abut onto the main frame, thereby adjusting a space between the main frame and the side plates.

However, in this conventional mono backbone type body frame, the right and left side plates are jointed by patching them using the bosses and the main frame. Therefore, in order to smoothly receive a load added to one side plate by the entire body frame including the right and left side plates and the main frame, and to exert sufficient vehicle rigidity, special actions such as increasing the thickness of the main frame or the boss diameter of the side plate are required.

SUMMARY OF THE INVENTION

The present invention addresses these problems and provides a motorcycle that maintains sufficient vehicle rigidity with a simple structure.

A motorcycle according to the present invention includes a main frame that has an up-and-down extension part extending in a vehicle up-and-down direction in a vehicle width center; side plates disposed apart on the right and left of the up-and-down extension part; and a supporting pipe that is fixed to the up-and-down extension part and extends in a vehicle width direction. The side plates are attached to both ends of the supporting pipe.

According to the present invention, the supporting pipe is fixed to the up-and-down extension part of the main frame and extends in the vehicle width direction, and the side plates are attached to right and left ends of the supporting pipe. Therefore, a load added to one side plate is smoothly transmitted through the supporting pipe to the entire body frame including the right and left side plates and the main frame. In this way, sufficient vehicle rigidity is maintained with a simple structure.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Embodiments of the present invention are now described in detail with reference to the drawings.

Figure 1:
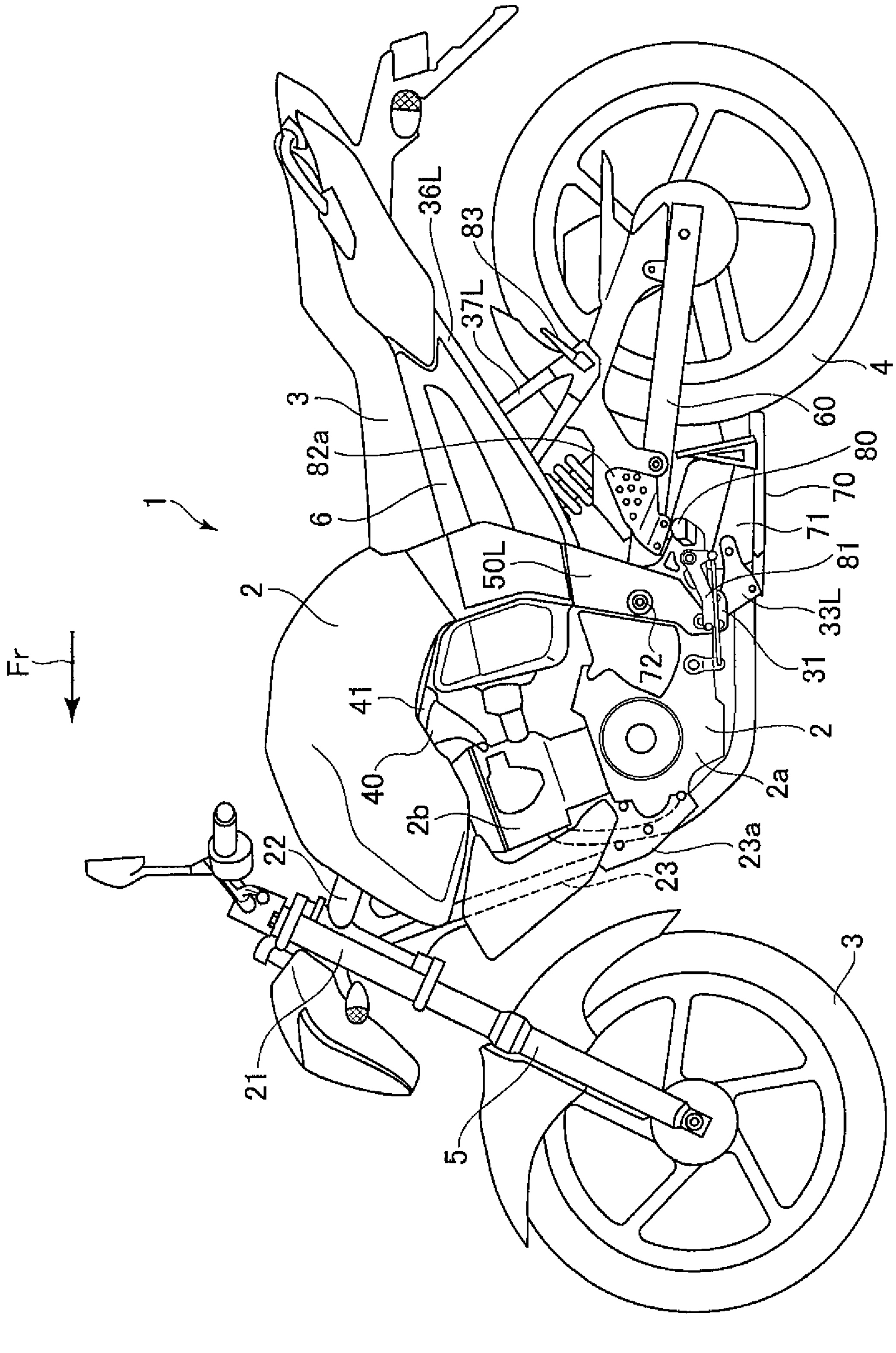
FIG. 1 is a side view of a motorcycle according to an embodiment of the present invention.
Figure 2:
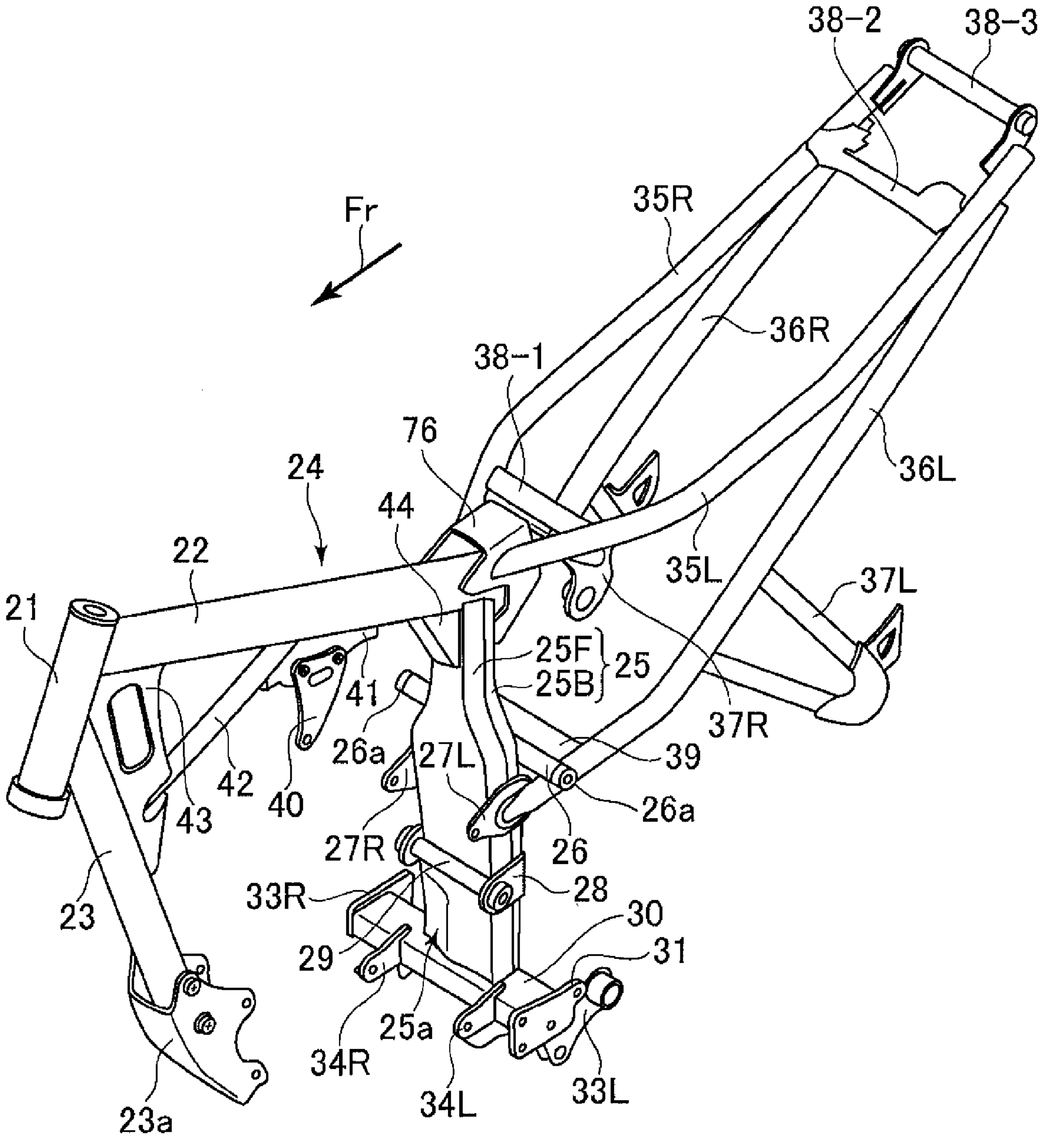
FIG. 2 is a perspective view of a body frame of the motorcycle.
Figure 3:
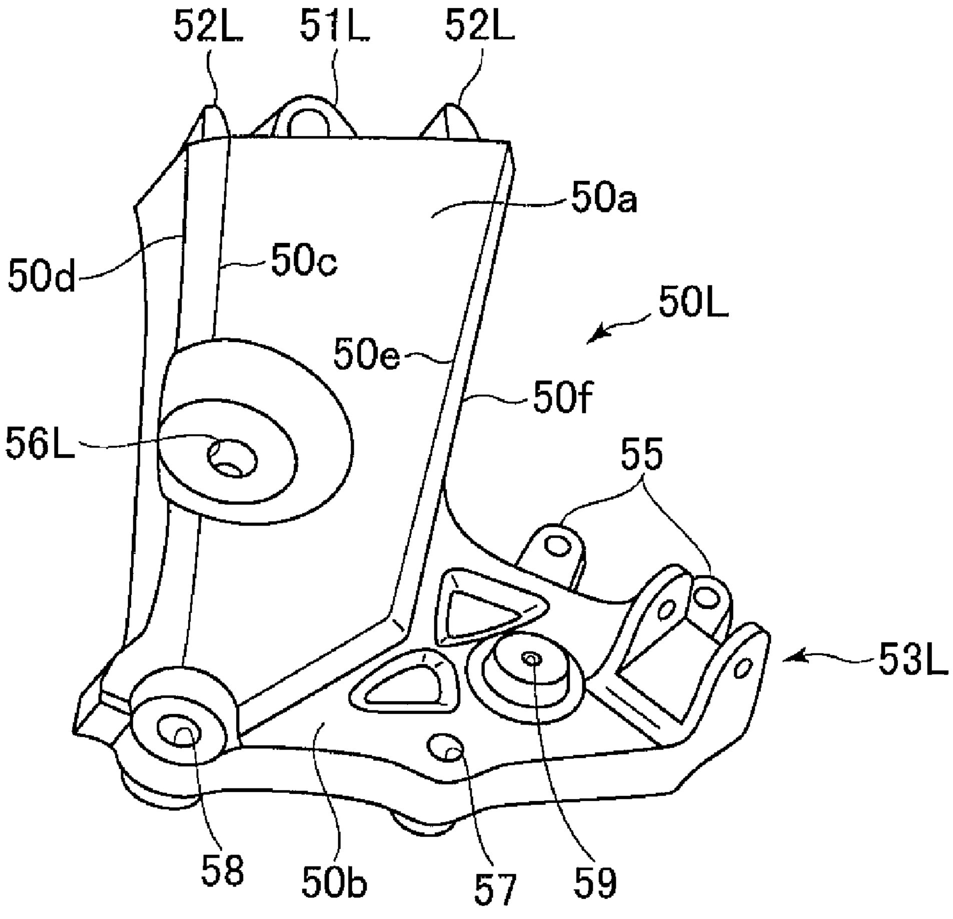
FIG. 3 is an enlarged perspective view of a side plate on a left side of the motorcycle.
Figure 4:
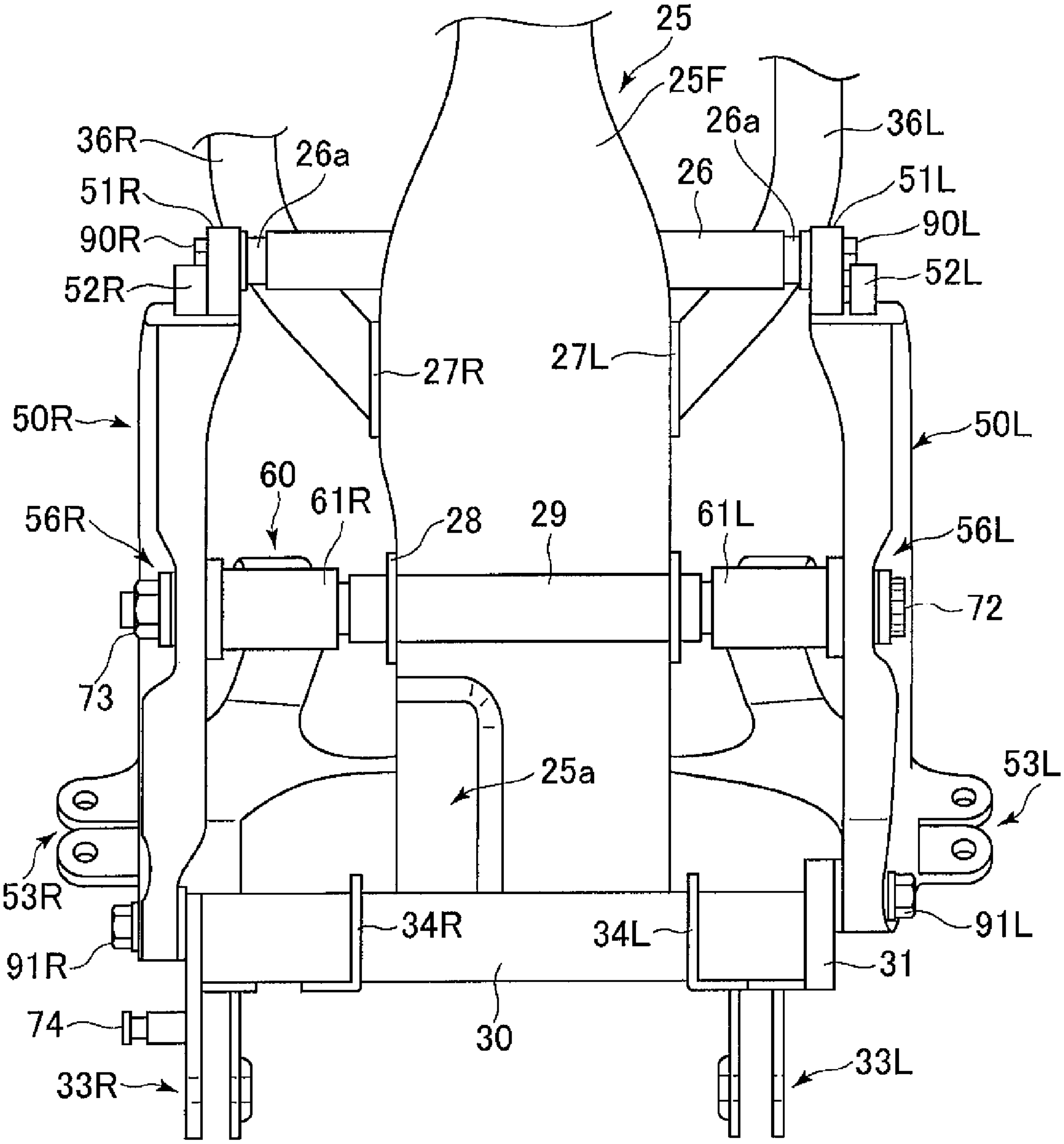
FIG. 4 is a front view of an up-and-down extension part of the body frame.
Figure 5:
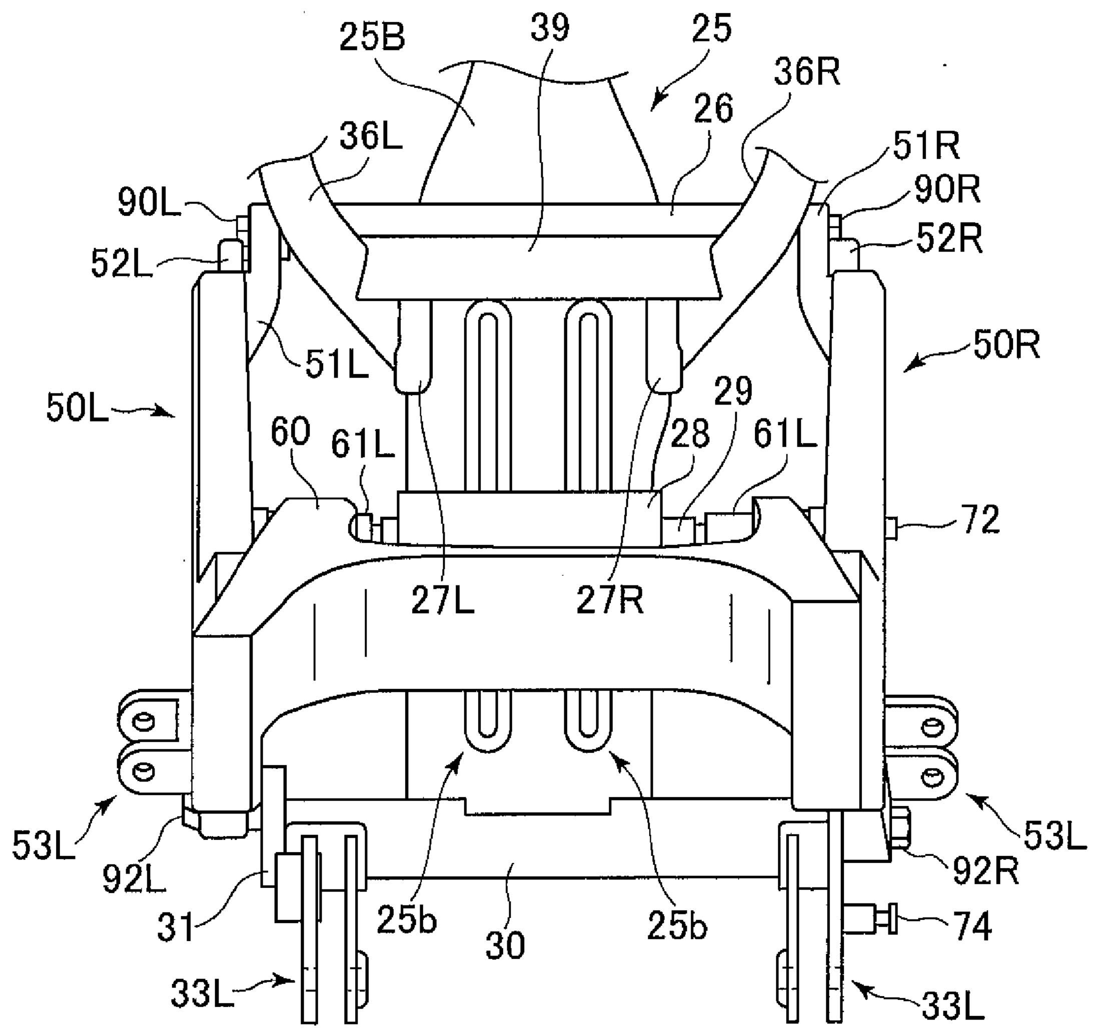
FIG. 5 is a rear view of the up-and-down extension part.

FIG. 1 is a side view of a motorcycle 1 according to an embodiment of the present invention. FIG. 2 is a perspective view of a body frame of motorcycle 1. FIG. 3 is an enlarged perspective view of a side plate 50L arranged on the left of an up-and-down extension part 25 of a main frame 24. FIG. 4 is a front view of up-and-down extension part 25. FIG. 5 is a rear view of up-and-down extension part 25.

As shown in FIG. 1, motorcycle 1 comprises a front fork 5 that rotatably supports a front wheel 3. An upper portion of front fork 5 is supported for free steering from side to side by a head pipe 21. As shown in FIG. 2, a fore-and-aft extension part 22 of main frame 24 is welded at its tip to a backside of head pipe 21 and linearly extends backwards and downwards in a vehicle width center. An upper end portion of a down tube 23 is also welded to head pipe 21 and extends linearly downward. A bracket 23*a* is attached to a lower end portion of down tube 23 and is fixed to a front side of a crank case 2*a* of an engine 2. A hanger 40 is attached to and extends downwards from a middle portion of fore-and-aft extension part 22 through a reinforcing member 41. A cylinder body 2*b* of engine 2 is fixed to the tip of hanger 40.

A side plate 50L, which is part of vehicle rigid members, is arranged at the rear of engine 2. A through bolt 72 extends in a vehicle width direction and is arranged in the vicinity of the center of the up-and-down direction of the side plate 50L. Through bolt 72 rotatably supports a front end portion of a rear swing arm 60 that supports a rear wheel 4 such that rear swing arm 60 can swing up and down around through bolt 72.

As shown in FIG. 1, a straddle type fuel tank 2 is disposed on fore-and-aft extension part 22. A riding seat 3 is disposed to the rear of fuel tank 2. As shown in FIG. 2, fore-and-aft extension part 22 of main frame 24 is a straight round pipe that extends from head pipe 21 to the vicinity of a rear end of fuel tank 2. A saddleback bracket 76 is welded to a rear end of fore-and-aft extension part 22 to cover the rear end from the above. Front end portions of right and left seat rails 35L, 35R are welded to both side surfaces of saddleback bracket 76. Seat rails 35L, 35R are also constituted by round pipe, and extend from side surfaces of saddleback bracket 76 outward and rearward, and thereafter linearly extend rearward and upward. Seat rails 35L, 35R are connected at three places by cross members 38-1, 38-2, 38-3 from a vehicle front in this order. Riding seat 3 is mounted on cross members 38-1, 38-2 and 38-3.

An up-and-down extension part 25, which extends linearly in a vehicle up-and-down direction, is welded to a rear end of fore-and-aft extension part 22. Fore-and-aft extension part 22 and up-and-down extension part 25 are each welded to saddleback bracket 76 and a reinforcing member 44, and are rigidly fixed to each other by saddleback bracket 76 and reinforcing member 44 arranged inside of a connecting place, and thus constitute main frame 24.

A reinforcing member 43 is welded to the inside of a connecting place of fore-and-aft extension part 22, head pipe 21 and down tube (round pipe) 23. Reinforcing member 41 is welded to a middle portion and bottom side of fore-and-aft extension part 22. A reinforcing pipe 42 is disposed between reinforcing member 41 and reinforcing member 43. Accordingly, fore-and-aft extension part 22, head pipe 21, and down tube 23 are fixed rigidly to each other.

Up-and-down extension part 25 includes a square front side pipe 25F and a square back side pipe 25B whose cross sections are rectangular and that are arranged such that their wide side surfaces are longitudinally directed, and that are fixed by welding. An upper portion of extension part 25 has a certain width, and the width gradually increases at a middle portion, and a bottom portion of extension part 25 again has a certain width. In other words, the width of up-and-down extension part 25 is varied in accordance with its extending (up-and-down) direction, thus maintaining the rigidity required for motorcycle 1.

A first supporting pipe 26 is welded to a rear side surface of back side pipe 25B. First supporting pipe 26 is a round pipe that extends linearly in the vehicle width direction. A cap 26*a* in which a female screw thread is formed is welded to the right and left ends of first supporting pipe 26.

L-shaped common brackets 27L, 27R are welded to side surfaces of up-and-down extension part 25 below first supporting pipe 26. Common brackets 27L, 27R have the shape of a flat plate bent inside at the rear end. The bent portion is also welded to a rear surface of back side pipe 25B, and an inner surface of a portion extending fore-and-aft is welded to side surfaces of front side pipe 25F and back side pipe 25B. The front ends of common brackets 27L, 27R protrude forward of a front surface of front side pipe 25F. A bolt insertion hole to fix a rear side surface upper side of crank case 2*a* is formed in the protruded portions. Front ends of back stays 36L, 36R constituted by round pipe are welded to outer surfaces of portions of common brackets 27L, 27R extending in the fore-and-aft direction. Back stays 36L, 36R extend rearward and upward to rear ends welded to lower surfaces of rear end sides of seat rails 35L, 35R. A cross member 39 is welded to front end sides of back stays 36L, 36R. Base end portions of rear footrest stays 37L, 37R, to which a footrest 83 (FIG. 1) is attached for a passenger to set his foot, are welded to and extend downward from middle portions of back stays 36L, 36R.

A pivot shaft bracket 28, which is in the shape of a long plate bent forward at the right and left, is attached below common brackets 27L, 27R. The bent portions of pivot shaft bracket 28 are welded to side surfaces of front side pipe 25F and back side pipe 25B, and a portion in between is welded to a rear surface of back side pipe 25B. Front ends of the bent portions of pivot shaft bracket 28 protrude forward of a front surface of front side pipe 25F. A round pivot shaft supporting pipe 29 extending linearly in a vehicle width direction is inserted in insertion holes formed in the protruded portions and fixed by welding.

A square second supporting pipe 30 extending linearly in the vehicle width direction is arranged at and connected to a lower end of up-and-down extension part 25 to forming the shape of an inverted letter T. Second supporting pipe 30 has a rectangular cross section and is arranged such that a wide side surface faces a vertical direction. An upper surface of second supporting pipe 30 is welded to a lower end surface of up-and-down extension part 25. A small flat plate 31 is welded to and closes an open left end of second supporting pipe 30. A center stand bracket 33L is formed with two parallel plates extending downwards and is welded to a lower surface left side of second supporting pipe 30. To center stand bracket 33L, an exhaust chamber 71 to which an exhaust pipe of engine 2 is connected is fixed, and a left side base end portion of center stand 70 that surrounds the periphery of exhaust chamber 71 in a retraction position is rotatably attached (FIG. 1). A center stand bracket 33R welded to a right end side of second supporting pipe 30 is also formed with two parallel plates extending downwards. An outside plate is welded to close a right side opening end of second supporting pipe 30, and an inside plate is welded to a lower surface of second supporting pipe 30. A right side base end portion of center stand 70 is rotatably attached to center stand bracket 33R. A spring attachment boss 74 to which one end of a spring for urging center stand 70 to a retraction position or an upright position is attached is formed in center stand bracket 33R. The other end of the spring is attached to a foot side of center stand 70.

Engine brackets 34L, 34R are welded to and protrude forward from a front surface of second supporting pipe 30, and fix a rear side surface lower side of crankcase 2*a* accordingly. Thus, a front portion of crankcase 2*a* is fixed by down tube 23, and a rear portion upper side of crankcase 2*a* is fixed to up-and-down extension part 25 through common brackets 27L, 27R. The rear part lower side of crankcase 2*a* is fixed to up-and-down extension part 25 through engine brackets 34L, 34R and second supporting pipe 30. Cylinder body 2*b* is fixed to fore-and-aft extension part 22 through hanger 40 and reinforcing member 41. In this way, engine 2 is rigidly fixed to various places of the body frame, and functions as part of the vehicle rigid members.

A recess 25*a* to accommodate the bulge of crankcase 2*a* is formed in a right side lower portion of a front surface of front side pipe 25F. As shown in FIG. 5, two grooves 25*b* extending in the up-and-down direction from a lower portion of pivot shaft bracket 28 to a rear end side portion of common brackets 27L, 27R are formed in the rear surface of rear side pipe 25B. Accordingly, the strength of up-and-down extension part 25 is enhanced.

As shown in FIGS. 1, 4 and 5, side plates 50L, 50R are separately arranged on the right and left of up-and-down extension part 25 of main frame 24. Side plates 50L, 50R are aluminum die casting members having generally the same shape. The following description is mainly for side plate 50L, and corresponding parts of side plate 50R are indicated by corresponding symbols and their descriptions are omitted.

As shown in detail in FIG. 3, side plate 50L integrally has a plate-shaped plate part 50*a* extending in the vehicle up-and-down direction, and a footrest bracket part 50*b* extending rearward from a lower portion of plate part 50*a*, which is generally L-shaped in a side view. Two generally parallel corners 50*c*, 50*d* extending in the up-and-down direction are formed at a front edge of plate part 50*a*. Two generally parallel corners 50*e*, 50*f* extending in the up-and-down direction are also formed at a rear edge of plate part 50*a*. Accordingly, the rigidity of plate part 50*a* is improved. An insertion hole 56L, through which through bolt 72 as a pivot shaft is inserted, is formed in a middle portion of plate part 50*a*. As shown in FIGS. 4 and 5, through bolt 72 inserted in insertion hole 56L sequentially passes a cylindrical shaped collar part 61L formed in the left side front end of rear swing arm 60, a pivot shaft supporting pipe 29, and a cylindrical collar part 61R formed in the right side front end of rear swing arm 60, and reaches an insertion hole 56R of side plate 50R. A nut 73 is screwed on the tip of through bolt 72. In this way, rear swing arm 60 is swingably supported by through bolt 72.

Protrusions 52L, which are arranged separately in the vehicle fore-and-aft direction and extend upward, are formed in an upper end surface of plate part 50*a* of side plate 50L. As shown in FIG. 1, a rear bottom portion of fuel tank 2 and a bottom portion of the riding seat 3 are covered by a resinous exterior side cover 6. Protrusions 52L of plate part 50*a* are covered by a rubber buffer cover and inserted in a hole formed in a lower surface of side cover 6 to fix a lower portion of side cover 6 to side plate 50L.

An upper part attachment bracket part 51L is formed inward in the vehicle width direction between protrusions 52L (back surface side of plate part 50). Upper part attachment bracket part 51L is formed in the shape of a plate extending upward in the vehicle width direction, and has a bolt insertion hole generally in the middle. As shown in FIGS. 4 and 5, a bolt 90L inserted in this insertion hole is screwed to a cap 26*a* at a left end of first supporting pipe 26 to fix an upper portion of side plate 50L to one end of first supporting pipe 26. As shown in FIGS. 4 and 5, bolt 90R is inserted in the opening of attachment bracket 51R and screwed to a cap 26*a* at a right end of first supporting pipe 26 to fix an upper portion of side plate 50R to the other end of first supporting pipe 26.

An attachment bolt insertion hole 58 is also formed in a bottom end portion of plate part 50*a*. As shown in FIG. 4, a bolt 91L passed through attachment bolt insertion hole 58 is screwed to small plate 31. An attachment bolt insertion hole 57 is also formed in a bottom edge portion of a footrest bracket part 50*b*. As shown in FIG. 5, a bolt 92L inserted in attachment bolt insertion hole 57 is also screwed to small plate 31. In this way, a bottom portion of side plate 50L is fixed to up-and-down extension part 25 side of main frame 24 at two places separated in the vehicle fore-and-aft direction. Similarly, side plate 50R is screwed to center stand bracket 33R by bolts 91R and 92R at two places separated in the vehicle fore-and-aft direction at the bottom edge portion thereof, and is fixed to main frame 24 in the up-and-down extension part 25 side through center stand bracket 33R. Side plate 50L is rigidly attached to a body frame side above and below through bolt 72 as a pivot shaft.

A footrest bracket 53L to support a base end portion of a footrest 80 (FIG. 1) is formed at a rear end portion of footrest bracket part 50*b* of side plate 50L. A shaft insertion hole 59 in which a rotational shaft of a shift pedal 81 (FIG. 1) is inserted is formed generally in the center of footrest bracket part 50*b*. Cover bracket parts 55 are formed in an upper edge of footrest bracket part 50*b*. A metal cover 82*a* (FIG. 1), which covers a side portion of rear swing arm 60, is fastened to cover bracket parts 55 by a bolt.

According to motorcycle 1, main frame 24 has fore-and-aft extension part 22 extending from head pipe 21 to the rear of the vehicle in the vehicle width center, and up-and-down extension part 25 extending in the vehicle up-and-down direction in the vehicle width center. Main frame 24 also includes side plates 50L, 50R that are separated to the right and left of up-and-down extension part 25. First and second supporting pipes 26 and 30 are fixed to up-and-down extension part 25 and extend in the vehicle width direction. Side plates 50L, 50R are attached to both ends of supporting pipes 26 and 30. According to this structure, a load added to side plates 50L, 50R smoothly transmits to the entire body frame through first and second supporting pipes 26 and 30. Thus, sufficient vehicle rigidity is maintained with a simple structure.

Up-and-down extension part 25 includes a square pipe extending in the vehicle up-and-down direction. Therefore, the body frame can be formed at low cost. Up-and-down extension part 25 is structured by front and back side pipes 25F and 25B, which extend in the vehicle up-and-down direction, and which are square pipes placed side by side and jointed to each other in the vehicle fore-and-aft direction. Therefore, the rigidity of the up-and-down extension part is enhanced at reasonable cost.

The flat side surfaces of front and back side pipes 25F and 25B face a vehicle fore-and-aft direction, and first supporting pipe 26 is jointed to a side surface in the rear side of up-and-down extension part 25. Therefore, first supporting pipe 26 can be rigidly welded to a flat surface of back side surface 25. First supporting pipe 26 may also be jointed to a side surface in the front side of up-and-down extension part 25. Grooves 25*b* extending in the vehicle up-and-down direction are formed in a rear surface of back side pipe 25B and enhance the strength (surface rigidity) of up-and-down extension part 25.

Common brackets 27L, 27R to which crankcase 2*a* of engine 2 is attached are jointed to up-and-down extension part 25. Therefore, engine 2 is fixed rigidly to up-and-down extension part 25. Furthermore, front ends of back stays 36L, 36R extending rearward and upward at the rear of up-and-down extension part 25 are welded to common brackets 27L, 27R. Accordingly, the bracket for supporting engine 2 and the bracket for supporting back stay 36L or 36R can be made to one piece, thereby reducing body weight and cost.

Second supporting pipe 30 is a square pipe that is jointed to a lower end of up-and-down extension part 25. Accordingly, rigidity in a direction parallel to a side surface of the square pipe is easily maintained. Side plates 50L, 50R are tightened to second support pipe 30 at plural positions, and thus are rigidly fixed to second support pipe 30. Furthermore, engine brackets 34R, 34L, to which a rear side of crankcase 2*a* of engine 2 is attached, are jointed to second supporting pipe 30. Accordingly, crankcase 2*a* is also fixed to second supporting pipe 30.

According to the present embodiment, down tube 23 extends downward from head pipe 21 and a lower end of down tube 23 is attached to a front side of crankcase 2*a* through bracket 23*a*, so that the body frame has a diamond shape and enhances vehicle rigidity. Furthermore, the width of up-and-down extension part 25 is varied depending on positions in its extending direction. Accordingly, the rigidity required for each position in the extending direction is easily maintained.

The invention claimed is:

1. A motorcycle comprising:

a main frame including an up-and-down extension part arranged to extend in an up-and-down direction of the motorcycle at a widthwise center of the motorcycle;

side plates disposed apart from each other on a right side and a left side of the up-and-down extension part; and a plurality of supporting pipes fixed to the up-and-down extension part and arranged to extend in a widthwise direction of the motorcycle; wherein the side plates are attached to each of a left side and a right side of at least one of the plurality of supporting pipes;

the plurality of supporting pipes are welded to an outer surface of the up-and-down extension part;

the up-and-down extension part includes a substantially rectangular pipe arranged to extend in the up-and-down direction of the motorcycle;

flat side surfaces of the substantially rectangular pipe face a fore-and-aft direction of the motorcycle; and the at least one of the plurality of supporting pipes is joined to a front surface or a rear surface of the up-and-down extension part.

2. The motorcycle according to claim 1, wherein the main frame includes a fore-and-aft extension part arranged to extend from a head pipe toward a rear of the motorcycle at the widthwise center of the motorcycle.

3. The motorcycle according to claim 1, wherein the up-and-down extension part includes a plurality of substantially rectangular pipes adjacent to each other in a fore-and-aft direction of the motorcycle, and the plurality of substantially rectangular pipes are joined to each other.

4. The motorcycle according to claim 1, wherein the substantially rectangular pipe is provided with a groove that extends in the up-and-down direction of the motorcycle.

5. The motorcycle according to claim 1, further comprising a bracket connected to the up-and-down extension part, wherein the bracket is attached to a crankcase of an engine.

6. The motorcycle according to claim 5, further comprising a back stay extending rearward and upward from the rear surface of the up-and-down extension part, wherein a front end of the back stay is connected to the bracket.

7. The motorcycle according to claim 1, wherein the plurality of supporting pipes includes a substantially square pipe connected to a lower end of the up-and-down extension part.

8. The motorcycle according to claim 1, wherein a width of the up-and-down extension part varies in the up-and-down direction of the motorcycle.

9. A motorcycle comprising:

a main frame including an up-and-down extension part arranged to extend in an up-and-down direction of the motorcycle at a widthwise center of the motorcycle;

side plates disposed apart from each other on a right side and a left side of the up-and-down extension part; and a supporting pipe fixed to the up-and-down extension part and arranged to extend in a widthwise direction of the motorcycle; wherein the side plates are attached to each of a left side and a right side of the supporting pipe;

the supporting pipe has a substantially square shape, and the supporting pipe is connected to a lower end of the up-and-down extension part; and the side plates are secured to the supporting pipe at a plurality of locations.

10. A motorcycle comprising:

a main frame including an up-and-down extension part arranged to extend in an up-and-down direction of the motorcycle at a widthwise center of the motorcycle;

side plates disposed apart from each other on a right side and a left side of the up-and-down extension part; and a supporting pipe fixed to the up-and-down extension part and arranged to extend in a widthwise direction of the motorcycle; wherein the side plates are attached to each of a left side and a right side of the supporting pipe;

the supporting pipe has a substantially square shape, and the supporting pipe is connected to a lower end of the up-and-down extension part; and a bracket is arranged to connect the supporting pipe to a rear side of a crankcase of an engine.

11. The motorcycle according to claim 10, further comprising:

a down tube arranged to extend downward from a head pipe; wherein a lower end of the down tube is attached to a front side of the crankcase.

* * * * *